United States Patent [19]

Engler et al.

[11] Patent Number: 5,110,655

[45] Date of Patent: May 5, 1992

[54] REMOVABLE, HIGH TEMPERATURE RESISTANT RETROREFLECTIVE MARKING MATERIAL

[75] Inventors: David A. Engler; Britton G. Billingsley, both of St. Paul, Minn.

[73] Assignee: Minnesota Mining and Manufacturing Company, St. Paul, Minn.

[21] Appl. No.: 599,073

[22] Filed: Oct. 17, 1990

[51] Int. Cl.$^5$ .................. G02B 5/128; B32B 7/06
[52] U.S. Cl. .................. 428/143; 428/40; 428/195; 428/906; 428/199; 428/325; 428/241; 428/246; 428/251; 428/354; 428/355; 428/522; 428/406; 428/447; 428/492; 428/412; 428/212; 428/450; 428/432; 428/441; 428/920; 428/921; 428/913; 2/5; 2/7; 2/8; 359/538; 359/540
[58] Field of Search .............. 428/40, 195, 906, 149, 428/143, 325, 241, 246, 251, 354, 355, 572, 406, 447, 492, 412, 212, 450, 432, 441, 920, 921, 913; 2/5, 7, 8; 350/105; 359/538, 540

[56] References Cited

U.S. PATENT DOCUMENTS

| | | | |
|---|---|---|---|
| 2,647,849 | 4/1950 | Douglas et al. | 350/105 |
| 3,700,305 | 8/1972 | Bingham | 350/105 |
| 3,758,192 | 9/1973 | Bingham | 350/105 |
| 3,885,246 | 5/1975 | Tung | 350/105 |
| 4,008,949 | 2/1977 | Luna | 350/105 |
| 4,519,154 | 5/1985 | Molari, Jr. | 428/325 |
| 4,533,592 | 8/1985 | Bingham | 428/213 |
| 4,534,673 | 8/1985 | May | 404/14 |
| 4,629,663 | 12/1986 | Brown et al. | 428/343 |
| 4,645,711 | 2/1987 | Winslow et al. | 428/355 |
| 4,699,842 | 10/1987 | Jorgensen et al. | 428/343 |
| 4,755,407 | 7/1988 | Mortensen et al. | 428/354 |
| 4,766,032 | 8/1988 | Pernicano | 428/325 |
| 4,817,210 | 4/1989 | Aldridge et al. | 2/81 |

FOREIGN PATENT DOCUMENTS 559261  2/1944  United Kingdom ............ 350/105

OTHER PUBLICATIONS

U.S. Federal Test Method Standard 191, Textile Test Methods, Method 5903, Jul. 20, 1978.
National Fire Protection Association (NFPA) Standard on Protective Clothing for Structural Fire Fighting, 1991 Edition, pp. 681-695.

*Primary Examiner*—Ellis P. Robinson
*Assistant Examiner*—Willaim P. Watkins, III
*Attorney, Agent, or Firm*—Gary L. Griswold; Walter N. Kirn; Robert H. Jordan

[57] ABSTRACT

A retroreflective marking material which can be secured to a substrate, e.g., a firefighter's helmet, and then readily removed when desired, even after exposure to heat and flame. The material comprises a retroreflective layer made up of a layer of retroreflective elements in a binder layer, a fire resistant fabric, and a defined fire resistant adhesive on the rear of the fire resistant fabric. The adhesive adheres strongly to polycarbonate and can be stripped from polycarbonate after being held in a forced air oven at 260° C. for 5 minutes. The marking material can contain fluorescent coloring agent(s) to afford good daylight visibility.

18 Claims, 1 Drawing Sheet

REMOVABLE, HIGH TEMPERATURE RESISTANT RETROREFLECTIVE MARKING MATERIAL

FIELD OF THE INVENTION

The present invention concerns a retroreflective marking material which can be applied to a desired substrate, providing highly visible appearance, and then can be conveniently and readily removed, even after exposure to high temperatures. The markings of the invention are particularly suited for use as markings on firefighters' helmets where they can facilitate identification of the company or assignment of a firefighter and then be cleanly removed when a different marking is desired.

BACKGROUND OF THE INVENTION

At the scene of a major fire there is a need for quick visual identification of each firefighter. Ideally, the identification is carried on the helmets worn by the firefighters. Reflexite Corporation of New Britain, Conn., currently sells retroreflective stickers for this purpose. Although their retroreflectivity initially affords good visibility, even in smoky areas; when exposed to heat and flames they readily melt, char, and lose their retroreflectivity and, after being so exposed, they are difficult to remove to permit application of fresh stickers. Other decals or labels are believed to have been used for marking fire helmets, but insofar as is known, they catch on fire when exposed to flames or the heat of a fire and the resulting char is difficult to remove.

U.S. Pat. No. 4,533,592 (Bingham) is concerned with making firefighters more visible under firefighting conditions. The patent discloses a fluorescent fabric (for good daytime visibility) that is partially covered by retroreflective sheeting (for nighttime visibility), which fabric does not char or melt when held in a forced air oven at 260° C. for 5 minutes, and has a char length less than 10.2 centimeters as measured by U.S. Fed. Test Method Standard 191, Textile Test Methods, Method 5903.

The Minnesota Mining and Manufacturing Company ("3M") currently sells retroreflective sheeting that is flame and heat resistant as SCOTCHLITE Brand Retroreflective Fabric No's. 8486, 8487, 8930, 8986, and 8987. These fabrics are sold as sew-on fabrics and do not possess adhesive backings.

Markings that are applied to hard substrates such as firefighter's helmets which are typically made of strong polycarbonate can not be sewn thereon. There exists a need for markings that can be securely attached to such substrates and that can subsequently be readily removed therefrom, even after exposure to high temperature and flame.

SUMMARY OF THE INVENTION

The invention provides a marking material which is retroreflective and hence highly visible. Marking materials of the invention are believed to be the first that can be adhesively applied to a desired substrate and are also:
1) resistant to the heat and flames commonly encountered in major fires, and
2) readily removable after exposure to such heat and flames.

Marking materials of the invention are thus well suited for use as helmet markings for firefighters' helmets. Marking materials of the invention can be used to permit personnel assignments at a fire to be indicated by temporary helmet markings that can be readily replaced to indicate different assignments. They also permit helmet markings that become scratched, blackened, or otherwise degraded to be replaced economically and conveniently with fresh markings.

In addition to being removable, marking materials of the invention should remain securely attached to a substrate such as a firefighter's helmet throughout the usual range of temperatures to which the substrate and attached marking are exposed. Firefighters' helmets are typically made of polycarbonate.

In brief summary, the marking materials of the invention comprise:
a) a flexible retroreflective sheeting comprising a retroreflective layer of typically closely packed retroreflective elements, e.g., substantially transparent microspheres in optical association with specularly reflective layers, partially embedded in and protruding from the front surface of a binder layer, a fire resistant fabric disposed behind the binder layer, and optionally a layer of adhesive, i.e., bonding adhesive, bonding the binder layer to the front of the fire resistant fabric; and
b) a layer of pressure-sensitive adhesive, i.e., mounting adhesive, covering the rear of the fire resistant fabric.

The mounting adhesive adheres sufficiently strongly to a desired substrate, e.g., polycarbonate, to secure the marking thereto and yet can be stripped cleanly from the substrate even after being held in a forced air oven at 260° C. for 5 minutes. Even after direct exposure to a flame, the novel marking materials should easily strip cleanly from a substrate.

Marking materials of the invention can provide a previously unattained combination of bright ambient appearance, bright retroreflective brightness, secure bond to a substrate such as a helmet, high resistance to damage from exposure to high temperatures and flames, and convenient removal when desired.

BRIEF DESCRIPTION OF THE DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
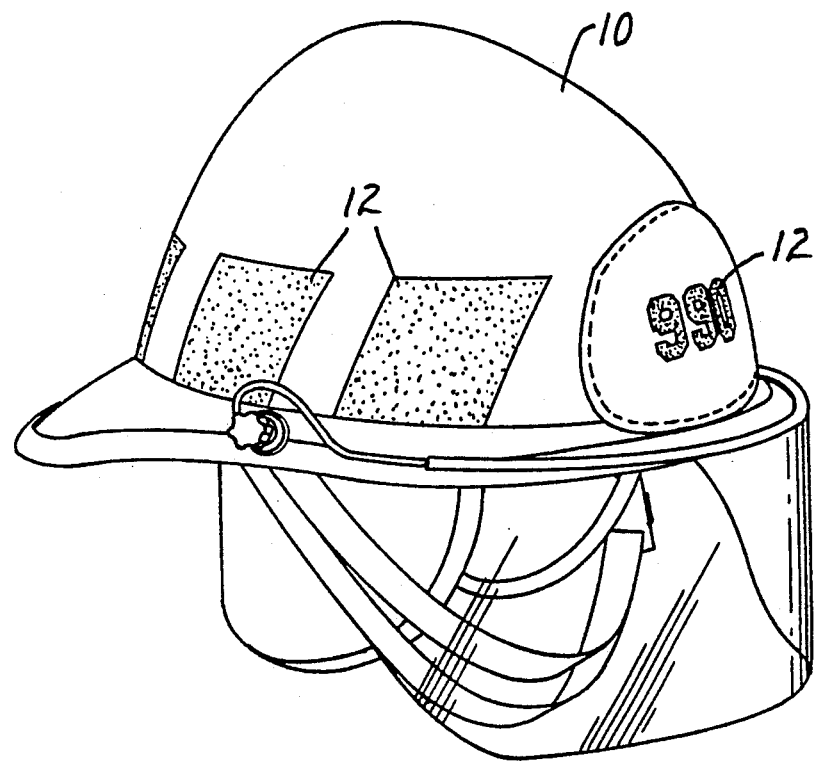
FIG. 1 is a side view of a firefighter's helmet bearing a helmet marking of the invention.
Figure 2:
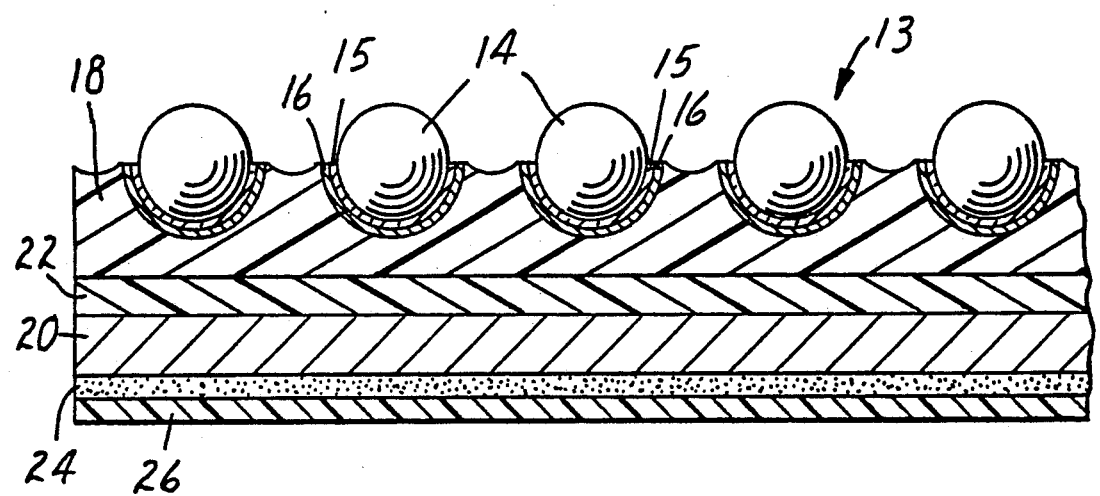
FIG. 2 is a schematic cross section through a portion of an illustrative embodiment of a marking material of the invention.

Shown in FIG. 1, adhered to polycarbonate helmet 10 are helmet markings 12 made of marking material of the invention. Shown in FIG. 2 is marking material 13 including a densely packed layer of glass microspheres 14, each having two transparent coatings 15 and 16 that differ in index of refraction by at least about 0.1, preferably at least about 0.3, to provide a substantially transparent specularly reflective layer on the rear thereof. Each of microspheres 14 is partially embedded in binder layer 18. Binder layer 18 is adhered to the front face of fire resistant fabric 20 by bonding adhesive 22 which preferably contains fire retardant. Mounting adhesive 24 covers the rear face of fabric 20, and is covered by removable release liner 26. Upon stripping off liner 26, marking material 12 can be secured with mounting adhesive 24 to substrate such as helmet 10 as shown in FIG. 1.

It will be understood that any of many different types of known retroreflective elements may be used in marking materials of the invention. Illustrative examples of suitable retroreflective elements include prisms and microspheres with specularly reflective layers. Microspheres with specularly reflective layers are preferred as they typically provide wide angles of retroreflective performance.

The exposed retroreflective elements probably exhibit good heat and flame resistance. Glass elements are typically preferred as such retroreflective elements typically tend to provide better heat and flame resistance than do polymeric elements. Also, glass elements typically exhibit greater durability, e.g., resistance to abrasion, and are less expensive than many polymeric retroreflective elements.

When microspheres with specularly reflective layers are used as retroreflective elements in markings of the invention, the specularly reflective layer is preferably substantially transparent. For example, as illustrated in FIG. 2, each microsphere may have two transparent hemispheric coatings on the rear thereof that differ in index of refraction by at least 0.1, preferably at least 0.3. Preferably, the index of refraction of inner coating 15 is from about 1.2 to 1.7, and that of outer coating 16 is from about 1.7 to 3.0. Microspheres with such specularly reflective layers are disclosed in U.S. Pat. No. 3,700,305 (Bingham) which is incorporated herein by reference. Such coatings are sometimes referred to as partially-light-transmissive reflective layers. The transparency of the microspheres and refractive coatings of the retroreflective layers disclosed in U.S. Pat. No. 3,700,305 permit a brightly colored binder layer to afford good daylight visibility, especially when the binder layer includes a fluorescent coloring agent. For instance, the National Fire Protection Association (NFPA) Standard on Protective Clothing For Structural Firefighting provides for fluorescent markings to be present on firefighters' clothing for added visibility and safety.

Alternatively, good daytime visibility can be afforded by constructing a marking having a retroreflective area bordered by a fluorescent area as in the trim material shown in the drawing of the aforementioned U.S. Pat. No. 4,533,592. However, by incorporating fluorescent material into the binder layer immediately beneath a substantially transparent retroreflective layer of microspheres as in U.S. Pat. No. 3,700,305, a marking material can be both retroreflective and fluorescent over its entire area. Hence, when numerals are die-cut from a large sheet, each numeral can be retroreflective and fluorescent over its entire area and hence readable both day and night. An advantage of marking materials of the invention is that sheets thereof can be made in or cut into desired shapes, e.g., alphanumeric characters and distinctive logos shapes.

Illustrative examples of other types of specularly reflective layers which may be used with microspheres in the present invention include metallic coatings, e.g., vapor-coated aluminum or silver, and binder layers which contain metallic, nacreous and other particles, around the rear, i.e., embedded portions of the microspheres. Retroreflective layers comprising microspheres and such specularly reflective layers are well-known.

In some instances, depending upon the characteristics of the binder material and fabric as well as the manner in which the marking material is assembled, the binder material will self-adhere directly to the fabric. Typically, however, an intermediate layer of adhesive, i.e., a bonding adhesive, will be used to attain a strong bond between the binder layer and the fabric.

Preferably, the bonding adhesive is based on a polymer that can be crosslinked to afford good heat resistance and durability. The bonding layer should be sufficiently flexible to permit the marking material to be applied to a desired substrate. An illustrative class of useful adhesives is urethanes which are typically preferred because of their reasonable cost and performance characteristics.

The fabric is typically selected to impart the desired overall tensile strength and tear resistance of the resultant marking material. Suitable fabrics may be of many different constructions, including for example, woven fabrics, knit fabrics, and non-woven fabrics. The fabric is preferably thermally stable so as to substantially retain its dimensions when heated up to about 260° C. The fabric is preferably fire retardant to improve the overall flame resistance of the marking material.

The mounting adhesive is typically an adhesive which is at least initially pressure-sensitive in order to facilitate application of a marking material of the invention to a substrate. It will be understood that other adhesives which meet the performance criteria discussed herein may be used in markings of the invention.

The mounting adhesive should be one which, after exposure of the marking and substrate to heat and flame, will permit removal of the marking from the substrate, preferably by hand and preferably leaving little or no residue on the substrate. Accordingly, the mounting adhesive is preferably such that, after exposure of the applied marking material and substrate to heat and flame, the bond of the mounting adhesive to the substrate is of lower strength than any of the bonds between other layers of the marking material, e.g., between the mounting adhesive and fire retardant fabric or between the bonding layer and the binder layer. Also, the bond of the mounting adhesive to the substrate is preferably low enough that the marking material may be removed from a substrate upon application by hand of a peeling force to the fabric without causing the fabric to shred or break into small pieces, both upon application of the marking material to a substrate and after exposure to heat and flame. Selection of mounting adhesive for particular embodiments of marking materials of the invention is thus dependent in part upon the particular substrates for which the marking material is being prepared as well as properties of the other materials used in the marking material. Typically, mounting adhesives used herein provide room temperature adhesion to the substrate of between about 100 and about 3,000 grams/inch-width, both before and after being exposed to temperatures of up to about 260° C. It will be understood that adhesives providing adhesion values outside this range may be used in marking materials of the invention. Use of adhesives which provide too little adhesion would result in markings tending to come loose prematurely, whereas use of adhesives which provide too much adhesion would result in markings tending to be too difficult to remove.

The mounting adhesive is preferably one as taught in one of U.S. Pat. Nos. 4,645,711 (Winslow et al.); 4,629,663 (Brown et al.); and 4,699,842 (Jorgensen et al.). These patents are all incorporated herein by reference in their entirety. The pressure-sensitive adhesive of U.S. Pat. No. 4,645,711 contains (1) a copolymer of alkyl acrylate (such as isooctyl acrylate) and a minor amount of at least one vinyl-unsaturated homopolymerizable emulsifier monomer which is a surfactant having both a hydrophobic and a hydrophilic moiety (such as sodium styrene sulfonate) plus (2) from about 5 to about 50 percent by weight of tackifier resin (such as a hydrogenated rosin ester). The pressure-sensitive adhesive of U.S. Pat. No. 4,629,663 is similar to that of U.S. Pat. No. 4,645,711 except that the emulsifier monomer comprises a monovalent salt of a styrene sulfonate, and a tackifier resin is not required. Typically, a preferred pressure-sensitive adhesive is that of U.S. Pat. No. 4,629,663 blended with a tacky adhesive that is capable of being emulsified in water, preferably one derived from rubbers, silicones, polyvinyl acetate modified acrylics, and polyvinyl acetates. Such compositions typically provide excellent heat stability. When a marking material of the invention incorporates a pressure-sensitive adhesive as taught in any of these three patents as the mounting adhesive, it can be peeled cleanly from a polycarbonate helmet after being exposed to a flame or after being held in a forced air oven at 260° C. for 5 minutes.

Typically, at least one of the bonding adhesive and the mounting adhesive contains fire retardant. Preferably, both adhesives contain such an agent. The fire retardant, at least at the levels employed, should not undesirably alter the properties of the adhesive(s). A preferred class of fire retardants is brominated biphenyls such as decabrominated diphenyl oxide which typically provide an optimal balance of cost and performance. Illustrative examples of other useful fire retardants include phosphate esters, alumina hydrates, other brominated compounds, chlorinated compounds, and antimony oxides.

To permit sheets of the marking material to be wound up into roll form for storage and shipment, the mounting adhesive layer is typically covered by a removable release liner. Such a liner can also be used to facilitate use and application of marking material. For example, a sheet of marking material can be die-cut except through the liner and cut-out waste or weed portions removed, permitting each die-cut shape to be kept in desired registration and/or later individually removed without disturbing the other shapes of the sheet.

The invention will be further explained in the following illustrative example. All amounts are expressed as parts by weight unless otherwise indicated.

EXAMPLE

As described in the aforementioned U.S. Pat. No. 3,700,305, a monolayer of closely packed glass microspheres was partially embedded into the polymer coating of a temporary carrier sheet and then a specularly reflective layer, comprising two transparent dielectric layers, the first having an index of refraction of about 1.3 and the second having an index of refraction of about 2.0, was applied thereover. The coated microspheres were then coated with a solution of 31.6 parts of polyester resin (Goodyear VPE-5545) plus 18.4 parts fluorescent yellow pigment (DAYGLO T17 Fluorescent Pigment) in 18.4 parts methyl isobutyl ketone, 15.8 parts methyl ethyl ketone, and 15.8 parts toluene to provide a pigmented binder layer. This 0.18 millimeter wet coating was dried for 3 minutes at 66° C. and 5 minutes at 93° C. Then a dispersion of 14.6 parts of urethane resin ("ESTANE" 5703), 23.8 parts titanium dioxide, 12.6 parts of fire retardant, 21.2 parts of methyl ethyl ketone, and 27.8 parts diacetone alcohol was coated over the binder layer to provide a bonding layer. Onto this 0.25 millimeter wet coating was laid a fire retardant polyester-nylon tricot fabric (basis weight of about 4.25 ounces/square yard, 34 grams/square meter), after which the assembly was dried at 66° C. for 3 minutes and then 107° C. for 6 minutes.

Onto the exposed surface of the tricot fabric was coated a 0.25 millimeter wet pressure-sensitive adhesive as described in the aforementioned U.S. Pat. No. 4,645,711, i.e., a solution of a copolymer of isooctyl acrylate and a small amount of sodium styrene sulfonate plus a hydrogenated rosin ester tackifier, to provide a mounting adhesive layer. After drying at 93° C. for 5 minutes the silicone release side of a removable paper release liner was laid onto the mounting adhesive layer.

After removing the release liner, pieces of the helmet marking material were adhered to fire helmets. Upon being subjected to a flame in accordance with U.S. Fed. Test Method Standard 191, Textile Test Methods, Method 5903, there was no after-flame although the helmet marking charred to limited degree.

When held in an oven for 5 minutes at 260° C., a second helmet marking did not burn, but discolored to a brown appearance.

After being subjected to −28° C. for several hours, a third helmet marking retained its initial fluorescent appearance and remained firmly adhered to the helmet, both at that low temperature and after again reaching room temperature.

None of these three markings exhibited any edge lifting, but each was readily and cleanly peeled from the helmet by hand after being returned to room temperature, leaving substantially no residue on the helmet.

Various modifications and alterations of this invention will become apparent to those skilled in the art without departing from the scope and spirit of this invention.

What is claimed is:

1. A marking material which comprises:
   a) a flexible retroreflective sheeting comprising a retroreflective layer of closely packed retroreflective elements protruding from the front of surface of a binder layer and a fire resistant fabric disposed behind the binder layer; and
   b) a mounting adhesive layer covering the rear of the fire resistant fabric, which mounting adhesive adheres strongly to polycarbonate and yet can be stripped cleanly from the polycarbonate after being held in a forced air oven at 260° C. for 5 minutes.

2. The marking material of claim 1 wherein said mounting adhesive comprises (1) a copolymer of alkyl acrylate and a minor amount of at least one vinyl-unsaturated homopolymerizable emulsifier monomer which is a surfactant having both a hydrophobic and a hydrophilic moiety and (2) from about 5 to about 50 weight percent of tackifier resin.

3. The marking material of claim 1 wherein said mounting adhesive comprises a copolymer of alkyl acrylate and a small amount of a monovalent salt of a styrene sulfonate.

4. The marking material of claim 1 wherein said mounting adhesive comprises a blend of (1) a tacky adhesive that is capable of being emulsified in water and (2) a copolymer of alkyl acrylate and a small amount of a monovalent salt of a styrene sulfonate.

5. The marking material of claim 4 wherein said tacky adhesive is derived from a member selected from the group consisting of: rubbers, silicones, polyvinyl acetate modified acrylics, and polyvinyl acetates.

6. The marking material of claim 1 wherein said mounting adhesive provides a room temperature adhesion to polycarbonate of between about 100 and about 3000 grams/inch-width.

7. The marking material of claim 1 wherein said retroreflective elements comprise substantially transparent microspheres with specularly reflective layers on the rear portions thereof.

8. The marking material of claim 7 wherein said specularly reflective layers comprise at least one member selected from the group consisting of: partially-light transmissive coatings, metallic coatings, or reflective particles in said binder layer.

9. The marking material of claim 8 wherein said specularly reflective layers comprise partially-light-transmissive coatings consisting of two layers that differ in index of refraction by at least about 0.1.

10. The marking material of claim 1 wherein said retroreflective elements comprise glass.

11. The marking material of claim 1 wherein said binder layer contains a fluorescent coloring agent.

12. The marking material of claim 1 wound upon itself in roll form for storage or shipment.

13. The marking material of claim 1 wherein said marking material is in the form of an alphanumeric character or a logo shape.

14. A polycarbonate helmet to which marking material of claim 1 has been adhered by said mounting adhesive.

15. A helmet marking material that can afford quick visual identification of a firefighter, which marking material comprises:
  a) a flexible retroreflective sheeting comprising a transparent retroreflective layer comprising closely packed microspheres protruding from a binder layer that contains a fluorescent coloring agent, each of said microspheres having an inner transparent coating having an index of refraction of between about 1.2 and about 1.7 and an outer transparent coating having an index of refraction of between about 1.7 and about 3.0, which transparent coatings differ in index of refraction by at least about 1.0, and a fire resistant fabric;
  b) a mounting adhesive layer covering the other face of the fire resistant fabric, which layer contains fire retardant, adheres strongly to polycarbonate, and yet can be stripped cleanly from the polycarbonate after being held in a forced air oven at 260° C. for 5 minutes; and
  c) a removable release liner covering said mounting adhesive layer.

16. The helmet marking material of claim 15 further comprising a layer of adhesive bonding said binder layer to the front of said fire resistant fabric.

17. The marking material of claim 1 further comprising a layer of adhesive bonding said binder layer to the front of said fire resistant fabric.

18. The marking material of claim 17 wherein at least one of said bonding layer and said mounting adhesive contains fire retardant.

* * * * *